(12) United States Patent
Keeler et al.

(10) Patent No.: US 7,218,388 B1
(45) Date of Patent: May 15, 2007

(54) VCSEL FAULT LOCATION APPARATUS AND METHOD

(75) Inventors: Gordon A. Keeler, Albuquerque, NM (US); Darwin K. Serkland, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 236 days.

(21) Appl. No.: 11/001,235

(22) Filed: Dec. 1, 2004

(51) Int. Cl.
*G01N 21/00* (2006.01)
(52) U.S. Cl. .................................... 356/73.1
(58) Field of Classification Search ............ None
See application file for complete search history.

(56) References Cited

U.S. PATENT DOCUMENTS

| | | | |
|---|---|---|---|
| 3,981,592 | A | 9/1976 | Williams |
| 4,070,118 | A | 1/1978 | Maslowski et al. |
| 5,493,577 | A | 2/1996 | Choquette et al. |
| 5,557,627 | A | 9/1996 | Schneider, Jr. et al. |
| 5,568,499 | A | 10/1996 | Lear |
| 5,978,401 | A * | 11/1999 | Morgan .............. 372/50.21 |
| 6,381,011 | B1 | 4/2002 | Nickelsberg et al. |
| 6,674,518 | B1 | 1/2004 | Asher et al. |
| 6,936,810 | B2 * | 8/2005 | Benedict .............. 250/234 |

OTHER PUBLICATIONS

M. K. Barnoski and S. M. Jensen, "Fiber waveguides: a novel technique for investigating attenuation characteristics", Applied Optics, vol. 15, No. 9 Sep. 1976 pp. 2112-2115.

S. D. Personick, "Photon Probe—An Optical-Fiber Time-Domain Reflectometer", Copyright c 1977 American Telephone and Telegraph Company, The Bell system Technical Journal, vol. 56, No. 3, Mar. 1997 pp. 355-366.

T. Knodl et al, "RCE Photodetectors Based on VCSEL Structures", IEE Photonics Technology Letters, vol. 11, No. 10, Oct. 1999, pp. 1289-1291.

Milan Dragas, et al, "Dual-Purpose VCSEL's for Short-Haul Bidirectional Communication Links", IEE Photonics Technology Letters, vol. 11, No. 12, Dec. 1999, pp. 1548-1550.

Darwin K. Serkland, et al, Monolithic Integration of Vertical-Cavity Surface-Emitting Lasers and Wavelength-Shifted Resonant-Cavity Photodetectors, Lasers and Electro-Optics Annual Meeting, LEOS Conference Proceedings, Nov. 10, 2001 pp. 566-567.

Vivien Verbrugge, et al, "A simple smart pixel based on a double VCSEL for free space optical interconnects", Optics Communications 214 (2002) pp. 78-81.

(Continued)

*Primary Examiner*—Tu T. Nguyen
(74) *Attorney, Agent, or Firm*—John P. Hohimer

(57) ABSTRACT

An apparatus for locating a fault within an optical fiber is disclosed. The apparatus, which can be formed as a part of a fiber-optic transmitter or as a stand-alone instrument, utilizes a vertical-cavity surface-emitting laser (VCSEL) to generate a test pulse of light which is coupled into an optical fiber under test. The VCSEL is subsequently reconfigured by changing a bias voltage thereto and is used as a resonant-cavity photodetector (RCPD) to detect a portion of the test light pulse which is reflected or scattered from any fault within the optical fiber. A time interval $\Delta t$ between an instant in time when the test light pulse is generated and the time the reflected or scattered portion is detected can then be used to determine the location of the fault within the optical fiber.

44 Claims, 6 Drawing Sheets

OTHER PUBLICATIONS

V. Bardinal, et al, "Experimental Demonstration of Oxide-mode Influence in a Dual-Purpose Oxide-Confined Vertical-Cavity Surface-Emitting Laser/Resonant Detector", Applied Physics Letters, vol. 81, No. 10, Sep. 2002 pp. 1771-1772.

Kent M. Greib, "High Density Interleaved VCSEL-RCPD Arrays for Optical Information Processing", presented at Photonics Fabrication Europe Conference, Oct.28-Nov. 1, 2002, Brugge, Belgium.

Evan Thrush, et al "Integrated Semiconductor Vertical-Cavity Surface-Emitting Lasers and PIN Photodetectors for Biomedical Fluorescence Sensing", IEEE Journal of Quantum Electronics, vol. 40, No. 5, May 2004 pp. 491-498.

Gordon A. Keeler, et al "In-Situ OTDR Measurements for Single-Mode Optical Networks with a Standard VCSEL" presented at IEEE LEOS Annual Meeting 2004, Puerto Rico, Nov. 7-11, 2004.

* cited by examiner

VCSEL FAULT LOCATION APPARATUS AND METHOD

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates to fault location in optical fibers and, in particular, to a vertical-cavity surface-emitting laser (VCSEL) fault location apparatus that uses a VCSEL which can be operated as a light emitter at one time and thereafter as a light detector to locate any faults within an optical fiber. The VCSEL fault location apparatus can also be built into a VCSEL fiber-optic transmitter so that the same VCSEL which is used as a transmitter for optical fiber communications can also be reconfigured to determine the presence and location of any faults within the optical fiber.

BACKGROUND OF THE INVENTION

In optical fiber communications there is a need to ascertain the location of any faults within an optical fiber so that these faults can be repaired, if needed. Currently, this must be done by disconnecting the optical fiber from a transmitter/receiver so that the optical fiber can be diagnosed using a separate testing apparatus. Optical time-domain reflectometry (OTDR) is commonly used to locate any faults (e.g. fiber breaks) in today's fiber-optic networks. The use of a separate testing apparatus to locate faults within an optical fiber is time consuming and costly and requires a trained operator.

The present invention provides an advance over the art of optical fiber fault location techniques and optical fiber communications by providing an optical fault location apparatus which can be built into a fiber-optic transmitter so that there is no need for a separate testing apparatus for locating any faults within an optical fiber. According to the present invention, a single vertical-cavity surface-emitting laser (VCSEL) can be used as an optical transmitter to transmit information through an optical fiber, and, when needed, can be quickly and simply converted into an in-situ fault location apparatus to locate any faults within the optical fiber. Then, just as quickly, can be reconverted to transmit additional information through the optical fiber. This dual functionality can allow for automation of the fault location process, and can reduce the cost and time required for fault detection in fiber-optic networks.

Additionally, the present invention can be used to form a stand-alone optical fault location apparatus that is simpler in construction than present-day devices which utilize a separate laser and photodetector.

These and other advantages of the present invention will become evident to those skilled in the art.

SUMMARY OF THE INVENTION

The present invention relates to an apparatus for locating a fault in an optical fiber (e.g. a single-mode optical fiber) which comprises an optical device that further comprises a pair of distributed Bragg reflector (DBR) mirrors sandwiched about a quantum-well active region, and a semiconductor junction formed about the quantum-well active region. The apparatus also comprises an electrical circuit connected to the optical device to provide a first bias voltage thereto to generate a pulse of light which is coupled into the optical fiber, and thereafter to provide a second bias voltage to the optical device to detect a portion of the light pulse which is reflected or backscattered from the fault in the optical fiber and coupled back into the optical device. The first bias voltage is preferably a forward-bias voltage which drives the optical device above a lasing threshold to generate the pulse of light. The second bias voltage can be smaller than the first bias voltage, and in certain embodiments of the present invention can be either a reverse-bias voltage, or a voltage that is substantially equal to zero.

The electrical circuit can comprise either a semiconductor diode or a transistor which is connected in series with the optical device to provide a low electrical impedance during an instant of time wherein the pulse of light is generated by the optical device, and to provide a higher electrical impedance during the time thereafter when the second bias voltage is provided to the optical device to detect the reflected or backscattered portion of the light pulse. An amplifier can also be provided in the apparatus with the amplifier having an input connected to a side of the optical device which is connected in series with the semiconductor diode. The amplifier receives an electrical output signal generated by the optical device upon detecting the reflected or backscattered portion of the light pulse, and provides an amplified output signal therefrom. A timing means can also be provided in the apparatus for determining a time interval between the instant of time the light pulse is generated and a time thereafter when the reflected or backscattered portion of the light pulse is detected by the optical device. This allows the location of the fault in the optical fiber to be precisely located by calculating the distance to the fault from timing information generated using the apparatus.

The present invention also relates to an apparatus for locating a fault in an optical fiber which comprises a vertical-cavity surface-emitting laser (VCSEL) that further comprises a pair of distributed Bragg reflector (DBR) mirrors sandwiched about a quantum-well active region; and an electrical circuit operatively connected to the VCSEL. The electrical circuit further comprises a switching device (e.g. a diode or a transistor) connected in series with the VCSEL, with the switching device being electrically conductive when the VCSEL is activated by a first input signal to generate a pulsed light output, and with the switching device being substantially nonconductive when the VCSEL is activated by a second input signal to detect a portion of the pulsed light output which is reflected or backscattered from the fault in the optical fiber. The electrical circuit also comprises an amplifier having an input connected to a side of the VCSEL which is connected to the switching device, with the amplifier receiving an electrical output signal generated by the VCSEL upon detecting the reflected or backscattered portion of the pulsed light output and providing an amplified output signal therefrom. The optical fiber generally comprises a single-mode optical fiber.

The first input signal forward biases the VCSEL to generate the pulsed light output. The second input signal can, but is not required to, reverse bias the VCSEL to detect the reflected or backscattered portion of the pulsed light output. In certain embodiments of the present invention, the second input signal can have a voltage level that is substantially equal to zero, or can even be positive to forward bias the VCSEL below a lasing threshold.

The present invention also relates to a vertical-cavity surface-emitting laser (VCSEL) fiber-optic transmitter having a built-in capability for locating a fault within an optical fiber which comprises a VCSEL having a pair of distributed Bragg reflector (DBR) mirrors sandwiched about a quantum-well active region; and an electrical circuit operatively connected to the VCSEL. The electrical circuit further comprises a switching device (e.g. a diode or transistor) connected in series with the VCSEL, and an amplifier having an input connected to a side of the VCSEL which is connected in series with the switching device. The switching device is electrically conductive when the VCSEL is activated by a first input signal to generate a pulsed light output or a modulated light output, and is substantially nonconductive when the VCSEL is activated by a second input signal to detect a portion of the pulsed light output which is reflected or backscattered from a fault in the optical fiber. The amplifier receives an electrical output signal from the VCSEL upon detecting the reflected or backscattered portion of the pulsed light output, and provides an amplified output signal therefrom. The optical fiber can comprise a single-mode optical fiber.

The first input signal forward biases the VCSEL to generate the pulsed light output or the modulated light output. The second input signal can reverse bias the VCSEL to detect the reflected or backscattered portion of the pulsed light output, or alternatively the second input signal can have a voltage level substantially equal to zero.

The present invention further relates to a vertical-cavity surface-emitting laser (VCSEL) fiber-optic transmitter having a built-in capability for locating a fault within an optical fiber (e.g. a single-mode optical fiber), comprising a VCSEL which further comprises a pair of distributed Bragg reflector (DBR) mirrors sandwiched about a quantum-well active region, with a semiconductor junction being formed about the quantum-well active region; and an electrical circuit connected to the VCSEL to forward-bias the semiconductor junction in the VCSEL to generate a modulated light output containing information to be transmitted through the optical fiber in response to a first electrical input signal, and to generate a test pulse of light for detecting the fault in the optical fiber in response to a second electrical input signal. After generating the test light pulse, the electrical circuit then biases the semiconductor junction in the VCSEL to form a resonant cavity photodetector to detect a portion of the test light pulse which is reflected or backscattered from the fault in the optical fiber to generate an electrical output signal having timing information about the location of the fault in the optical fiber.

The electrical circuit can further comprise an amplifier having an amplifier input electrically connected to one side of the semiconductor junction to amplify the electrical output signal and provide an amplified output signal having the timing information about the location of the fault in the optical fiber. The electrical circuit can also comprise a semiconductor diode or a transistor connected in series with the VCSEL.

The present invention relates to an optical-fiber communication method which comprises steps for transmitting information through an optical fiber (e.g. a single-mode optical fiber) as a series of light pulses produced by a vertical-cavity surface-emitting laser (VCSEL) comprising a pair of distributed Bragg reflector (DBR) mirrors sandwiched about a quantum-well active region; and detecting a fault within the optical fiber using the VCSEL by generating a test light pulse from the VCSEL at an instant in time, and coupling the test light pulse into the optical fiber; and for a period of time thereafter detecting with the VCSEL a portion of the test light pulse which is reflected or backscattered from the fault in the optical fiber. The optical-fiber communication method can further comprise a step for determining the location of the fault within the optical fiber by comparing the instant in time when the test light pulse is generated by the VCSEL to a time thereafter when the reflected or backscattered portion of the test light pulse is detected with the VCSEL.

The step for transmitting information through the optical fiber can comprise providing the information as an electrical input signal, and modulating the VCSEL using the electrical input signal. Modulating the VCSEL using the electrical input signal can comprise digitally modulating the VCSEL.

The step for generating the test light pulse can comprise forward-biasing the VCSEL above a lasing threshold, and can comprise providing a semiconductor diode or transistor in series with the VCSEL, and switching the semiconductor diode or transistor to an "on" state (i.e. an electrically conductive state).

The step for detecting the reflected or backscattered portion of the test light pulse with the VCSEL can comprise reverse-biasing the VCSEL, or alternately biasing the VCSEL at a bias voltage substantially equal to zero, or even forward-biasing the VCSEL below the lasing threshold. The step for detecting the reflected or backscattered portion of the test light pulse further can comprise providing a semiconductor diode or a transistor connected in series with the VCSEL, and switching the semiconductor diode or transistor to an "off" state (i.e. a substantially nonconductive state).

The present invention further relates to an apparatus for locating a fault within a single-mode optical fiber. The apparatus comprises a vertical-cavity surface-emitting laser (VCSEL) which further comprises a quantum-well active region surrounded by a pair of distributed Bragg reflectors, with the VCSEL generating a pulse of light that is coupled into one end of the single-mode optical fiber, and subsequently detecting a portion of the pulse of light which reflected or backscattered from the fault to provide an indication of the location of the fault within the single-mode optical fiber. An electrical circuit is also provided in the apparatus and is operatively configured to forward-bias the VCSEL to generate the pulse of light at one instant of time, and is operatively configured to not require reverse-biasing of the VCSEL to detect the portion of the reflected or backscattered light pulse of light.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
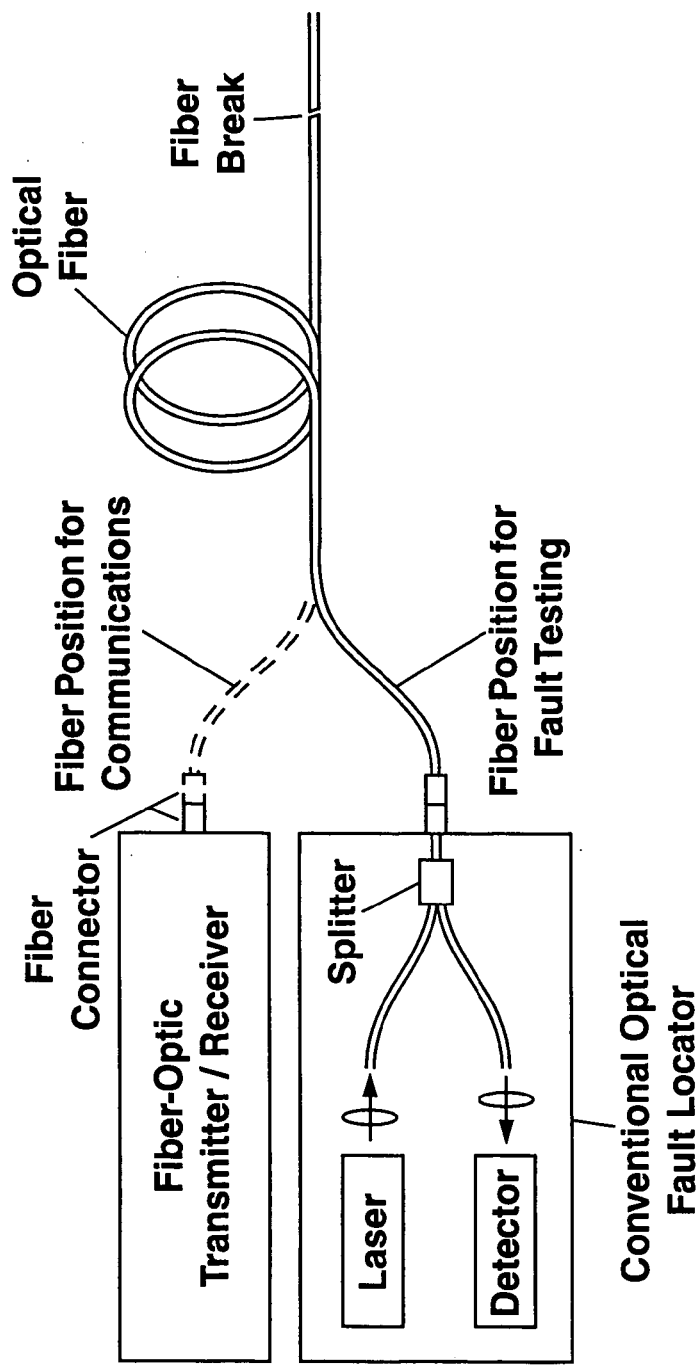
FIG. 1 illustrates conventional optical fiber fault detection which requires an optical fiber to be disconnected from a fiber-optic transmitter/receiver and reconnected to a conventional optical fault locator in order to determine the presence and location of any faults within the optical fiber. The conventional optical fault locator includes a separate laser and detector.

Referring to FIG. 1, there is shown schematically a conventional optical fault locator which includes a separate laser and light detector. The laser generates a pulse of light (indicated by the horizontal arrow pointing to the right in FIG. 1) which is coupled into an optical fiber to be tested through an optical fiber splitter. Any reflected or backscattered light from a fault within the optical fiber (e.g. the fiber break shown in FIG. 1) is then coupled back into the conventional optical fault locator and directed by the splitter to the separate light detector. The timing between when the pulse of light is generated by the laser and when the reflected or backscattered pulse of light is detected by the detector can then be used in conjunction with a knowledge of the refractive index of the optical fiber to determine the location of the fault within the optical fiber since the distance d to the fault is given by:

$$d = \frac{c\Delta t}{2n}$$

where c is the speed of light, Δt is a time delay between emission of the pulse of light and detection of a portion thereof reflected or backscattered from the fault in the optical fiber, and n is the refractive index of the optical fiber.

The conventional optical fault locator in FIG. 1 requires that the optical fiber be disconnected from a fiber-optic transmitter/receiver (also termed a transceiver) prior to testing for any faults within the optical fiber. This is time consuming and costly since it requires human intervention. Additionally, the use of a separate laser and light detector in the conventional optical fault locator requires two coupling lenses and an optical fiber splitter in order to couple light into and out of the optical fiber.

Figure 2:
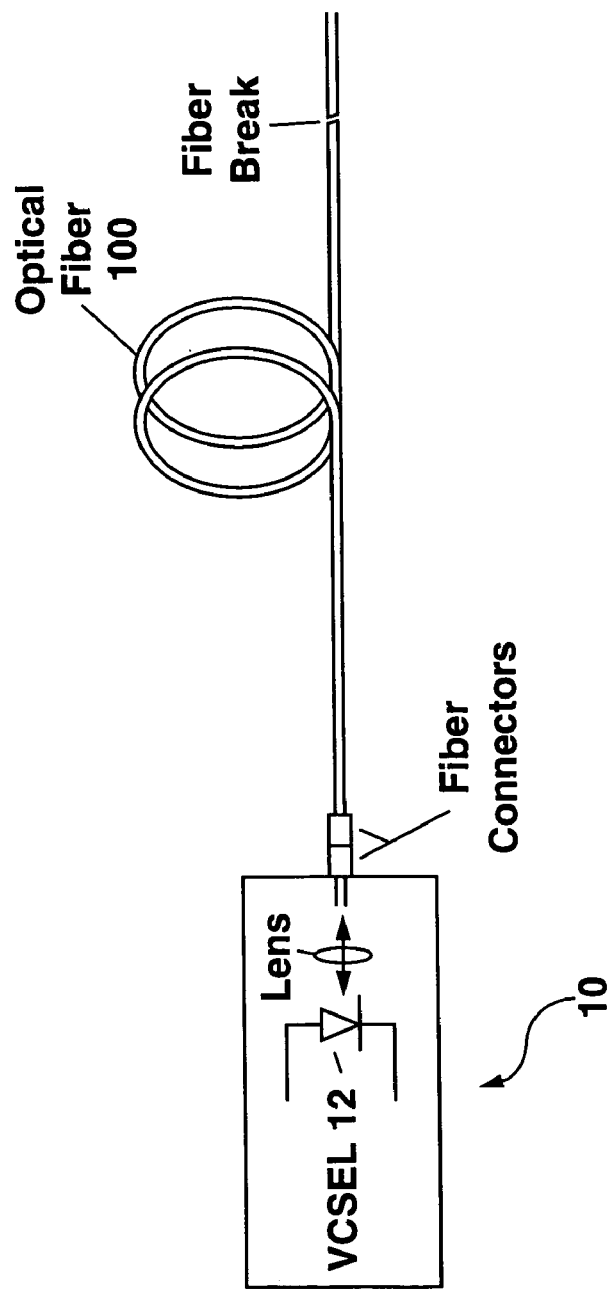
FIG. 2 illustrates fault detection according to the present invention using a fault location apparatus that comprises a vertical-cavity surface-emitting laser (VCSEL) which can also be used as a resonant cavity photodetector (RCPD).

The present invention which is based on the use of a vertical-cavity surface-emitting laser (also termed a VCSEL or an optical device) provides a simpler solution to the problem of fault testing in optical fibers. Additionally, the VCSEL-based optical fault locator of the present invention can be incorporated directly into a fiber-optic transmitter or transceiver so that fault testing of an optical fiber can be performed without disconnecting the optical fiber. In some cases, the fault detection can be performed automatically so that no human intervention is required other than to fix an optical fiber determined to have a fault therein when that is needed. FIG. 2 schematically illustrates a fiber-optic transmitter 10 according to the present invention which includes a built-in optical fault locator based on the use of a VCSEL 12 which can be reconfigured at different times to either generate light pulses, or detect light pulses.

Figure 3:
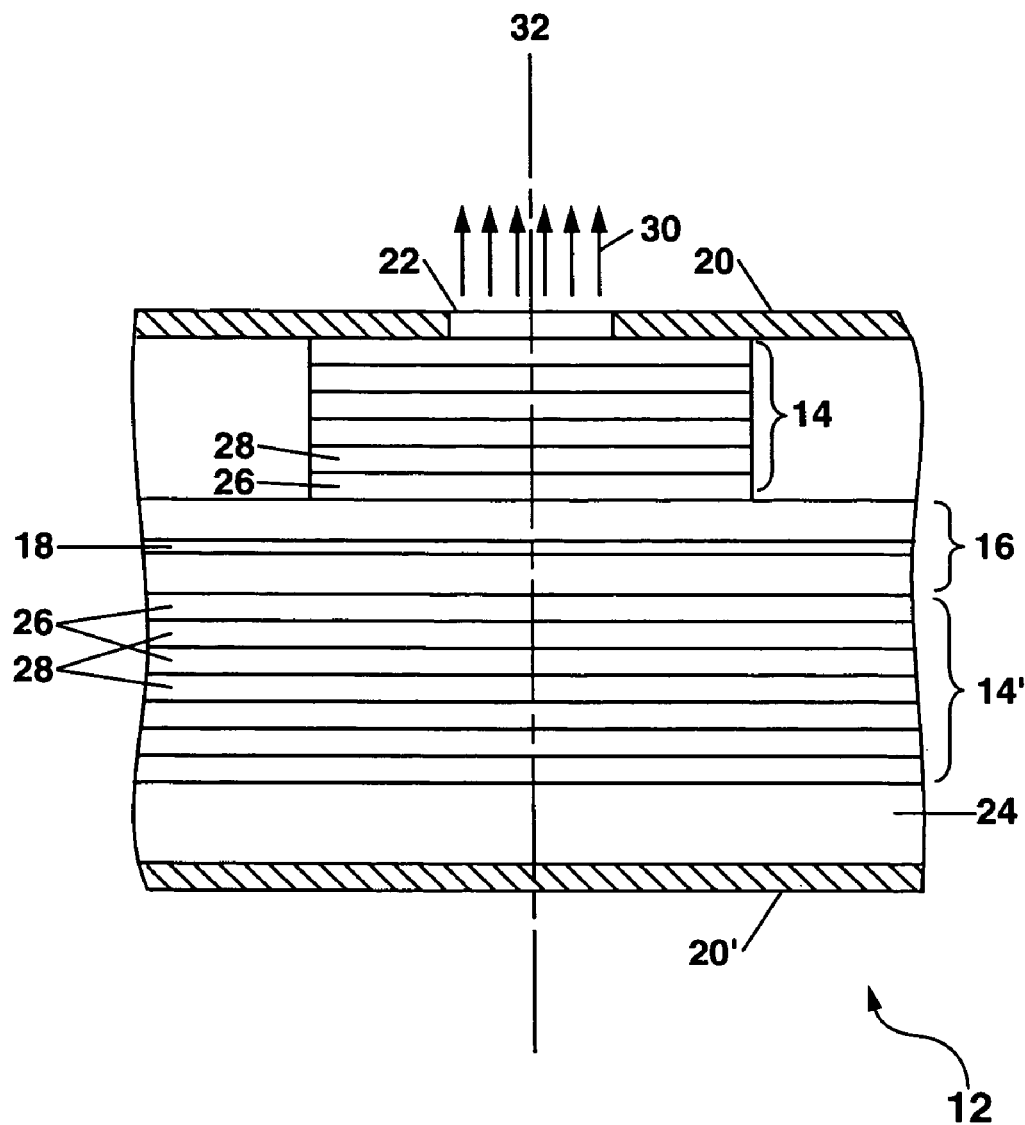
FIG. 3 shows a schematic cross-section view of an example of a VCSEL which can be used in the apparatus of FIG. 2.

The VCSEL optical device 12, which is shown in the schematic cross-section view of FIG. 3, comprises a pair of distributed Bragg reflector (DBR) mirrors 14 and 14' which are sandwiched about a quantum-well active region 16 which includes one or more quantum-well layers 18 (e.g. comprising gallium arsenide for operation at 0.85 μm wavelength, or comprising indium gallium arsenide nitride for operation at 1.3 μm). A semiconductor junction is formed about the quantum-well active region 16. The semiconductor junction can be formed by doping one of the DBR mirrors n-type during epitaxial growth by molecular beam epitaxy (MBE) or by metalorganic chemical vapor deposition (MOCVD), and by doping the other DBR mirror p-type. Alternately, both DBR mirrors 14 and 14' can be of the same doping type (e.g. n-type doped) with a tunnel junction being located between one of the DBR mirrors and the quantum-well active region 16 to form a p-n junction or p-i-n junction about the quantum-well active region 16. Electrodes 20 and 20' are provided above and below the active region 16 to supply electrical current to the VCSEL 12 to produce lasing light therein. Some of the lasing light 30 can be coupled out of the VCSEL 12 through an opening 22 formed in one or both of the electrodes 20 or 20'. In some embodiments of the present invention, one or both of the electrodes 20 and 20' can be at least partially transparent to couple out the lasing from the VCSEL 12.

The various layers 14, 14', 16 and 18 in the VCSEL 12 can be epitaxially grown upon a semiconductor substrate 24 which generally comprises a II-VI or III-V compound semiconductor (e.g. gallium arsenide or indium phosphide). Each DBR mirror 14 and 14' comprises a plurality of alternating layers of a high-refractive index III-V compound semiconductor material 26 and a low-refractive index III-V compound semiconductor material 28, with the exact III-V compound semiconductor materials selected for the DBR mirrors 14 and 14' and the active region 16 being dependent upon a predetermined wavelength for lasing of the VCSEL 12. In general, VCSELs 12 have been developed for operation at wavelengths from the ultraviolet to the near infrared, with lasing wavelengths in the range of 1.3–1.6 μm being preferred for long-distance optical fiber communications to minimize transmission losses, and with shorter wavelengths being useful for short-haul optical fiber communications where the transmission loss is not a primary consideration. Although, FIG. 3 shows a VCSEL 12 having a mesa structure formed in the DBR mirror 14, those skilled in the art will understand that other types of VCSELs can be used for practice of the present invention including VCSELs using ion implantation (e.g. with protons) or oxide apertures for current confinement. Further details on the structure and fabrication of VCSELs can be found in U.S. Pat. Nos.

5,493,577; 5,557,627; and 5,568,499 which are incorporated herein by reference. VCSELs 12 suitable for practice of the present invention are available commercially.

Lasing light is generated within the VCSEL 12 by forward-biasing the semiconductor junction therein. Since the semiconductor junction in the VCSEL 12 acts as an electrical diode, those skilled in the art will understand that forward-biasing the semiconductor junction can be performed by applying a voltage across the VCSEL 12 using electrodes 20 and 20' so that electrons and holes flow into the active region 16 to recombine in one or more quantum-wells 18 to produce the lasing light once a threshold for lasing is reached. This is generally done by applying a positive voltage to a p-type doped side (i.e. a cathode side) of the VCSEL 12, with an n-type doped side (i.e. an anode side) of the VCSEL 12 being electrically grounded; or alternately by applying a negative voltage to the anode side of the VCSEL 12, with the cathode side being electrically grounded. In some cases, a positive voltage can be applied to the cathode side of the VCSEL 12 and a negative voltage can be simultaneously applied to the anode side thereof. In the case of a unipolar VCSEL 12, both DBR mirrors 14 and 14' are generally n-type doped to minimize optical losses in the mirrors 14 and 14' which would otherwise result from p-type doping of one of the DBR mirrors 14 or 14'. In this case, the cathode side of the unipolar VCSEL 12 can be ascertained by measuring a flow of an electrical current through the VCSEL 12 or by ascertaining the presence of a p-n tunnel junction on the cathode side adjacent to the active region 16, with the p-n tunnel junction acting to convert electrons into holes for injection into the active region 16.

The DBR mirrors 14 and 14' form a cavity about the active region 16 which provides optical feedback for lasing and which results in lasing light 30 being emitted along an optical axis 32 which is substantially normal to the plane of the substrate 24 (e.g. upward in the VCSEL 12 of FIG. 3, or downward through the substrate 24 in other types of VCSELs 12 useful for practice of the present invention).

If the semiconductor junction in the VCSEL 12 is reverse-biased, the VCSEL 12 can be converted into a resonant cavity photodetector (RCPD), with the active region 16 absorbing incident light which is at substantially the same wavelength of the lasing light which is generated when the VCSEL 12 is forward-biased. It is also possible to form a RCPD by providing a bias voltage that is substantially equal to zero volts across the semiconductor junction in the VCSEL 12. Any light incident on the RCPD along the optical axis 32 will be coupled into the cavity formed by the DBR mirrors 14 and 14' when the incident light is resonant with the cavity. The light will then be reflected back and forth by the DBR mirrors 14 and 14' and be absorbed by the quantum-well layer(s) 18 within the active region 16 to produce an electrical output signal across the semiconductor junction in the RCPD. Additionally, operation of the VCSEL 12 with a forward-bias voltage below a threshold for lasing can also be used to detect any light pulse reflected or backscattered into the VCSEL resonant cavity since this reflected or backscattered light pulse will produce a change in the current and voltage characteristics of the VCSEL which can be detected.

Returning to FIG. 2, the VCSEL 12 can be used for optical communications through an optical fiber 100 which is generally a single-mode optical fiber. Lasing light 30 emitted by the VCSEL 12 can be coupled into one end of the optical fiber 100 using a lens (e.g. a graded-index lens also termed a GRIN lens), or alternately using butt-coupling. The transmission of the light 30 through the optical fiber 100 will be reduced by absorption in the fiber 100 and by any faults within the fiber 100. The term "fault" is used herein to refer to any localized discontinuity including a crack, a fracture, a break, a splice or a small-radius bend that attenuates the transmission of light through the fiber, and can further include a fiber termination such as an end of the optical fiber, or a connection to another optical fiber or to a photodetector, transmitter, transceiver, etc.

To transmit information through the optical fiber 100 to a remote detector or transceiver, the lasing light 30 from the VCSEL 12 can be modulated to produce a modulated light output. This can be done using digital modulation which turns the lasing light 30 on and off to produce a series of light pulses in response to a digital electrical signal which is inputted into an electrical circuit that drives the VCSEL 12. The digital electrical signal can be superimposed upon a direct current (d.c.) bias level which forward biases the VCSEL 12 below the threshold for lasing as shown in FIG. 4B. Each pulse in the digital electrical signal then drives the VCSEL 12 above the threshold for lasing to produce a corresponding lasing pulse of light 30 which is coupled into one end of the optical fiber 100 and transmitted to the other end thereof for detection. Using a predetermined clock rate, the presence of a lasing pulse of light 30 over a clock cycle can be used to signify a logical "1" state; and the absence of a lasing pulse of light 30 over another clock cycle can signify a logical "0" state. In this way information can be transmitted through the optical fiber 100 at a high data rate of up to several GigaHertz (GHz) or more. Multiple data streams can also be transmitted on a single optical fiber 100, if needed, by wavelength multiplexing the lasing light 30 from a plurality of VCSELs 12 operating at different wavelengths. The multiplexed lasing light 30 can then be detected at the other end of the optical fiber 100 after separating the different wavelengths of light with a grating, or with narrow-band filters.

To detect the presence of a fault within the optical fiber 100, the same VCSEL 12 used to transmit information over the optical fiber 100 can be reconfigured to generate a test pulse of light which can then be detected by operating the VCSEL 12 as a resonant cavity photodetector (RCPD). This can be done as described hereinafter using an electrical circuit which allows the VCSEL 12 to be activated in different ways depending upon particular input signals provided to the VCSEL 12.

Figure 4A:
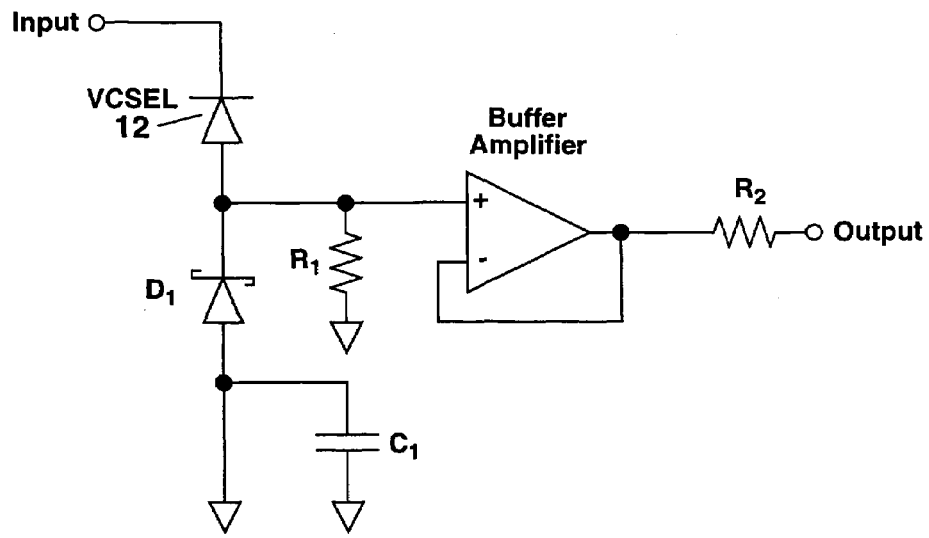
FIG. 4A shows a first example of a fault location apparatus according to the present invention. The configuration of FIG. 4A can be used either as a VCSEL fiber-optic transmitter having a built-in fault location capability, or as a stand-alone fault detection instrument.
Figure 4B:
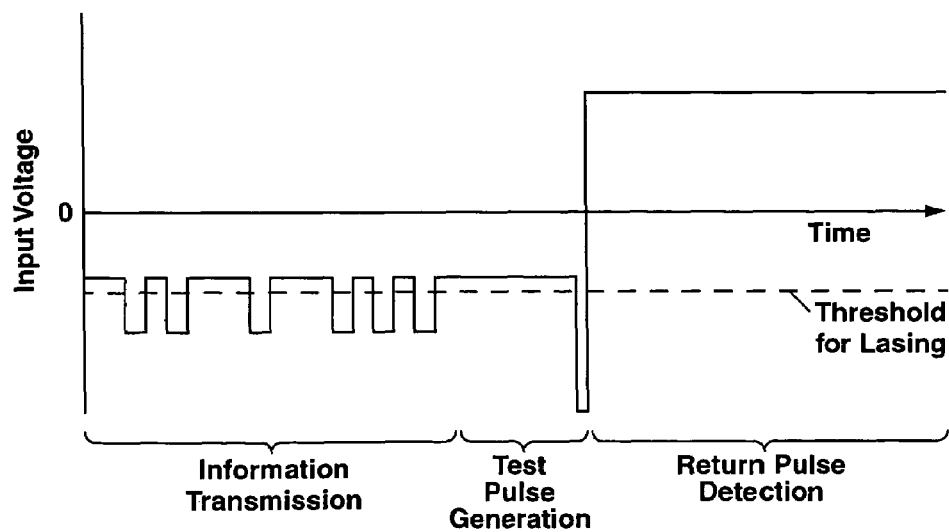
FIG. 4B shows various input voltages provided to the apparatus of FIG. 4A at different times to transmit information, to generate a test pulse of light, and to detect a return pulse reflected or backscattered from a fault within an optical fiber.

A first example of an optical fault locator according to the present invention is shown schematically in FIG. 4A. In FIG. 4A, the optical fault locator is formed as a part of the fiber-optic transmitter 10 of FIG. 2 to provide an in-situ fault testing capability. In FIG. 4A, an electrical circuit for the optical fault locator comprises a Schottky diode $D_1$ which is placed in series with the VCSEL 12 to act as a switching device for providing a low electrical impedance in series with the VCSEL 12 when the VCSEL 12 is lasing, and to provide a higher electrical impedance in series with the VCSEL 12 when the VCSEL 12 is not lasing. The Schottky diode $D_1$ has a low capacitance and allows rapid switching between an "on" state for generating a test pulse of light with the VCSEL 12 and an "off" state wherein the VCSEL 12 can be operated as a RCPD to detect a portion of the test light pulse which is reflected or backscattered from any faults within the optical fiber 100. In the "on" state, the Schottky diode $D_1$ provides a relatively low electrical impedance on the order of a few Ohms or less; and in the "off" state, the electrical impedance of the Schottky diode $D_1$ is relatively high, being on the order of one kiloOhm to one MegaOhm. Switching of the Schottky diode $D_1$ "on" or "off" will depend upon the magnitude and sign of an input voltage applied to an input of the electrical circuit in FIG. 4A.

In FIG. 4B, to transmit information in digital form through the optical fiber 100 in FIG. 2, a series of negative data pulses can be provided to the input superimposed on a d.c. bias level which is slightly below the threshold for lasing (which is indicated by the dashed line in FIG. 4B). To test for any faults within the optical fiber 100, the information transmission can be temporarily terminated. A test pulse of light can then be generated using the same VCSEL 12 and coupled into the optical fiber 100 to test for any faults therein. This can be done by applying a voltage pulse signal to the input of the electrical circuit. The voltage pulse signal as shown in FIG. 4B can be, for example, 25 nanoseconds (ns) long to generate a test light pulse of about the same duration. The width of the voltage pulse signal will, in general, determine a spatial resolution for locating any faults within the optical fiber 100. If desired, the voltage pulse signal can also exceed the input voltage used to transmit information through the optical fiber 100 in order to provide a higher power level for the test light pulse than that used for information transfer. In some instances, the power level for the test light pulse may be limited by optical-fiber transmission protocol standards. In general, the power level for the test light pulse can be on the order of 1–10 milliWatts.

Whenever the VCSEL 12 is operated above the threshold for lasing in FIG. 4B, the Schottky diode $D_1$ is turned "on" to provide a low-impedance in series with the VCSEL 12 and between the input of a buffer amplifier and ground (i.e. in parallel with $R_1$). This maintains the voltage at a node between the VCSEL 12 and the Schottky diode $D_1$ at a relatively low voltage (e.g. a few tenths of a volt) as determined by the particular Schottky diode $D_1$ used and thereby helps to prevent any overload of the input to the buffer amplifier which is connected to this same node. This can be seen in FIG. 4C where the negative peak labelled "A" corresponds to the generation of the test pulse of light from the VCSEL 12.

After generation of the test pulse of light, the input voltage can be reduced below the threshold for lasing to allow the VCSEL 12 to operate as a RCPD as described previously and to switch "off" the Schottky diode $D_1$ thereby providing a high-impedance in series with the VCSEL 12 and in parallel with $R_1$. Biasing of the VCSEL 12 at a predetermined level, which can be near zero volts, or positive as shown in FIG. 4B to reverse-bias the VCSEL 12, can then be maintained for a period of time to detect any reflected or backscattered portion of the test light pulse to determine the existence and location of any faults within the optical fiber 100. The period of time (i.e. time interval) for detection of the reflected or backscattered portion of the test light pulse generally corresponds to the time for the test light pulse to travel along a predetermined length of the optical fiber 100 and for the reflected or scattered portion thereof to return back to the VCSEL 12 operating as a RCPD.

In the example of FIG. 4B, a reverse-bias voltage is shown applied to the VCSEL 12 after generation of the test pulse of light. The reverse-bias voltage can be up to 10–20 volts depending upon a reverse breakdown voltage for the VCSEL 12. Operating with a reverse-bias voltage near the reverse breakdown voltage of the VCSEL 12 can be advantageous to produce an avalanche gain which will further increase the output signal from the VCSEL 12 provided to the buffer amplifier.

Figure 4C:
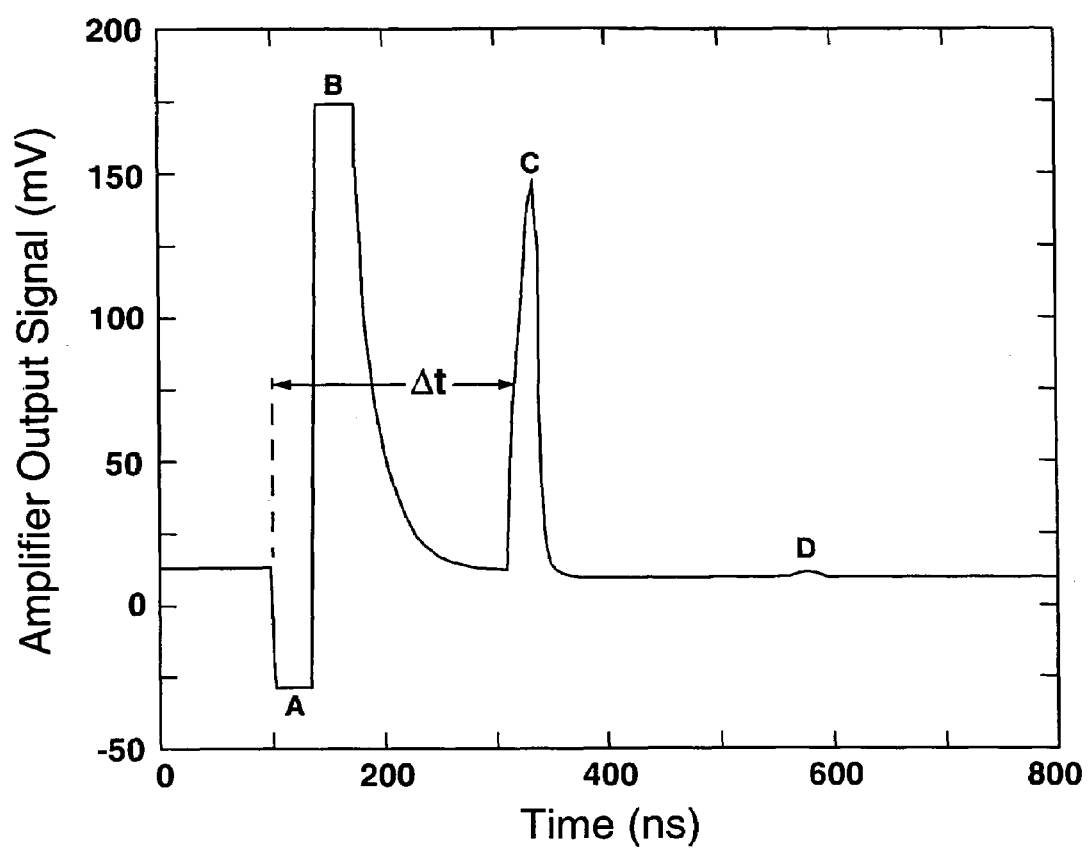
FIG. 4C shows an example of the amplifier output signal over time from the apparatus of FIG. 4A and a measured time delay Δt which can be used to determine the location of a fault within the optical fiber. The return pulse produced by the fault in the optical fiber is labelled "C".

In the amplifier output signal shown in FIG. 4C, measured using a single-mode oxide-confined VCSEL 12 operating at 850 nm, switching from a negative input voltage for generating the test pulse of light to a positive voltage level for reverse-biasing the VCSEL 12 to detect a fault within the optical fiber 100 results in an RC transient labelled "B" due to charge storage in the Schottky diode $D_1$. After a time interval $\Delta t$ which corresponds to a round-trip time to a fault within the optical fiber 100, the reflected or backscattered portion (also termed a return portion) of the test light pulse is coupled back into the VCSEL 12 and detected. This results in an amplified output signal labelled "C" in FIG. 4C. Some of the reflected or backscattered portion is further reflected off the DBR mirror 14 in the VCSEL 12 and makes another round trip pass to the fault and back resulting in a much smaller detected light signal labelled "D" located at twice the time interval (i.e. $2\Delta t$) after initiation of the test light pulse.

In the example of FIG. 4C, the fault being measured is an unterminated end of a 20-meter-long single-mode optical fiber 100 which corresponds to a "perfect-break" reflectivity of about 4%. This fault results in the return portion of the test light pulse being detected after a time interval $\Delta t=210$ ns. The electrical circuit of FIG. 4A provides a transimpedance gain of 1 kiloOhm (kΩ) and a bandwidth of approximately 100 megaHertz (MHz). In the example of FIGS. 4A–4C, values of the circuit elements $R_1$, $R_2$ and $C_1$ were $R_1$=1 kΩ, $R_2$=50Ω, and $C_1$=0.1 picoFarads (pF). The approximately 100 MHz bandwidth of the electrical circuit in the example of FIGS. 4A–4C provides a spatial resolution of about 1 meter for locating the fault in the optical fiber 100.

Although not shown in FIG. 4A, an additional amplifier (e.g. a 30-dB low-noise voltage amplifier) can be connected to the output of the electrical circuit to provide further amplification for the detected return portion of the test light pulse. To measure the time interval $\Delta t$ from the instant in time when the test pulse of light is generated in the VCSEL 12 to the time when the reflected or backscattered portion (also termed a return portion or a return light pulse) of the test light pulse is coupled back into the VCSEL 12 and detected, a timing apparatus such as an oscilloscope, a transient digitizer, or a timing circuit can be used. The timing apparatus (also termed a timer) can be connected to the output of the buffer amplifier in FIG. 4A, or to the output of the additional amplifier, if used.

After detecting the fault in the optical fiber 100, the transmission of information through the optical fiber 100 can be resumed.

Figure 5A:
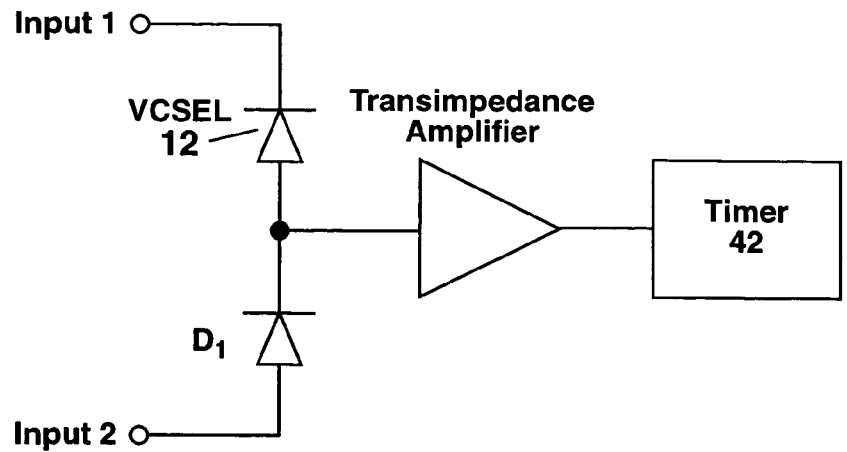
FIGS. 5A and 5B show alternative circuit arrangements which can be used for the fault location apparatus of the present invention.
Figure 5B:
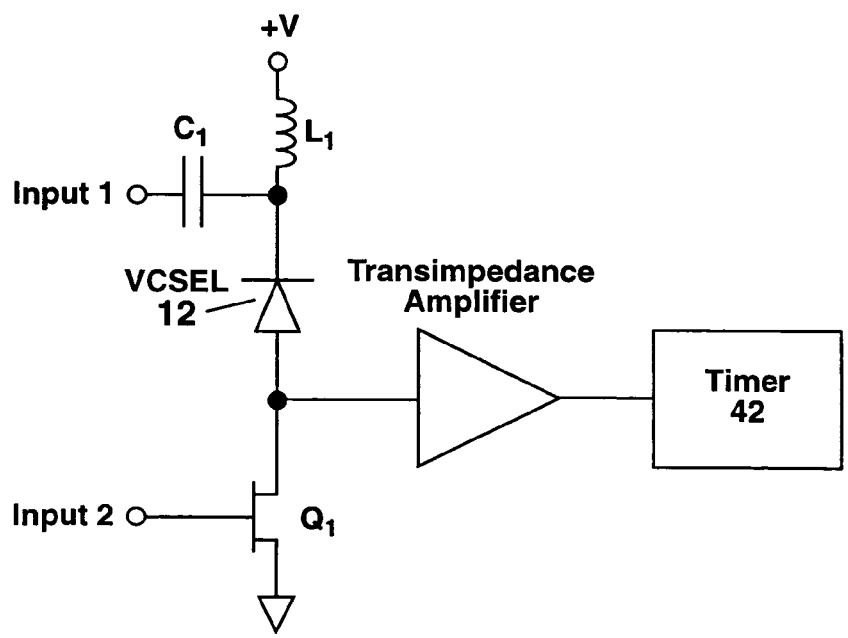

FIGS. 5A and 5B show other examples of the fault detection apparatus of the present invention which can be used for in-situ optical fault detection within a fiber-optic transmitter 10. In the examples of FIGS. 5A and 5B, the circuits shown provide a first bias voltage to operate the VCSEL 12 as a laser to generate one or more test pulses of light for coupling into an optical fiber 100 under test, and then to provide a second bias voltage to operate the VCSEL 12 as a resonant-cavity photodetector (RCPD) to detect a portion of each test light pulse that is reflected or scattered from a fault within the optical fiber 100. A switching device (either a semiconductor diode or a transistor) is used in the electrical circuits of FIGS. 5A and 5B in series with the VCSEL 12. The switching device is can be made electrically conductive to provide a low electrical impedance of generally less than 10 Ohms when the VCSEL 12 is lasing in response to the first bias voltage. When the VCSEL 12 is acting as a RCPD with the second bias voltage applied, the switching device is substantially nonconductive and provides a high electrical impedance of greater than 10 kiloOhms so that an electrical output signal from the RCPD is efficiently coupled into a transimpedance amplifier for amplification thereof. The circuits of FIGS. 5A and 5B also allow conventional operation of the VCSEL 12 so that the fiber-optic transmitter 10 can transmit information through the optical fiber 100.

In FIG. 5A, the electrical circuit comprises a semiconductor diode $D_1$ connected in series with the VCSEL 12, and a transimpedance amplifier connected to a node between the VCSEL 12 and the diode $D_1$. The electrical circuit in the example of FIG. 5A uses complementary input voltages, with the voltages provided to Input 1 being similar to that shown in FIG. 4B, and with the voltages provided to Input 2 being of the opposite polarity and of substantially the same magnitude as the voltages provided to Input 1. This provides a balanced input to the transimpedance amplifier and thereby helps to prevent overloading of the input to the transimpedance amplifier.

Forward-biasing of the VCSEL 12 in FIG. 5A produces lasing for transmitting information through the optical fiber 100 as a series of light pulses, or alternately to produce a test light pulse as described previously with reference to FIGS. 4A–4C. During the time for transmitting information or for generating a test light pulse, the semiconductor diode $D_1$ is turned "on" to provide a low impedance in series with the VCSEL 12. After the test light pulse has been generated, the bias voltage to the VCSEL 12 can changed to operate the VCSEL 12 below threshold, near a zero bias voltage, or at a reverse-bias voltage to detect any reflected or backscattered portion of the test light pulse. During this time, the bias voltage provided to Input 2, which is complementary (i.e. opposite) to that provided to Input 1, preferably increases the impedance of the semiconductor diode $D_1$ (e.g. by turning diode $D_1$ "off"). A portion of the test light pulse which is reflected or backscattered from a fault within the optical fiber 100 is detected by the VCSEL 12 to generate an output signal (i.e. a detected light signal) which is fed into the input of the transimpedance amplifier. The transimpedance amplifier provides an amplified output signal to a timer 42 which can be used to determine the time delay $\Delta t$ for the return light pulse. A measurement of the time delay $\Delta t$ can then be used to determine the location of the fault within the optical fiber 100. The timer 42 can be a digital oscilloscope, a transient digitizer, or any circuit capable of measuring the time delay $\Delta t$ between the test light pulse and the detected return light pulse. Multiple test light pulses can be used with signal averaging in the timer 42 to improve a signal-to-noise ratio for detection of the fault within the optical fiber 100 under test. The transimpedance amplifier can provide a gain of, for example, $10^3$ V/A or more.

FIG. 5B shows another electrical circuit which can be used for practice of the present invention. In FIG. 5B, a transistor $Q_1$ (e.g. a field-effect transistor) is connected in series with the VCSEL 12. A transimpedance amplifier is connected to a node between the transistor $Q_1$ and the VCSEL 12. To generate lasing within the VCSEL 12, a negative input pulse is applied to Input 1 and coupled to the VCSEL 12 via a coupling capacitor $C_1$ (with a capacitance of, for example, 100 pF or less), while at the same time, a positive input pulse is provided to Input 2 to switch "on" the transistor $Q_1$. In the "on" state, the transistor $Q_1$ presents a relatively low impedance of generally a few Ohms or less in series with the VCSEL 12 to minimize a signal input to the transimpedance amplifier. Lasing in the VCSEL 12 can be used to transmit information over the optical fiber 100, or to generate a test light pulse for locating one or more faults within the optical fiber 100.

After a test light pulse has been generated by the VCSEL 12, the VCSEL 12 can be reverse-biased for use as a RCPD to detect a portion of the test light pulse which is reflected or backscattered from any fault within the optical fiber 100. This can be done by providing a positive voltage +V to a cathode side of the VCSEL 12 through an inductor $L_1$ and by ceasing to provide any pulses to the Inputs 1 and 2 so that the transistor $Q_1$ is switched "off". In the "off" state, transistor $Q_1$ provides a relatively high impedance (e.g. $10^3$–$10^6 \Omega$) in series with the VCSEL 12 so that any alternating-current (ac) output signal generated upon detecting a reflected or backscattered portion of a test light pulse by the VCSEL 12 acting as a RCPD will be coupled into the transimpedance amplifier and amplified. A timer 42 as described previously can be connected to the output of the transimpedance amplifier to measure a time delay $\Delta t$ for use in determining the location of any fault within the optical fiber 100.

Although the fault location apparatus 10 of the present invention has been described in terms of being located within a VCSEL fiber-optic transmitter 10 to provide an in-situ fault location capability, those skilled in the art will understand that the fault location apparatus can also be provided as a stand-alone instrument. This can be done by omitting the input voltages provided to generate lasing within the VCSEL 12 for information transmission and instead supplying input pulses only to generate one or more test pulses of light, with the VCSEL 12 being biased for use thereafter as a RCPD to detect a reflected or backscattered portion of the test light pulse. The input voltages required to generate the test pulses of light and to bias the VCSEL 12 thereafter for use as a RCPD can be generated externally (e.g. with a computer or microprocessor) or internally (e.g. with a microprocessor). To test for any faults within an optical fiber 100, the stand-alone fault location apparatus can be connected to one end of the optical fiber 100 and operated as described previously to generate the test pulse of light and to subsequently detect any return light signal, with a time delay $\Delta t$ between the instant the test light pulse is generated and the return light signal is detected then providing information from which the location of any fault within the optical fiber 100 can be determined.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An apparatus for locating a fault in an optical fiber, comprising:
   (a) an optical device further comprising a pair of distributed Bragg reflector (DBR) mirrors sandwiched about a quantum-well active region, with the optical device further comprising a semiconductor junction formed about the quantum-well active region; and
   (b) an electrical circuit connected to the optical device to provide a first bias voltage thereto to generate a pulse of light which is coupled into the optical fiber, and thereafter to provide a second bias voltage to the optical device to detect a portion of the light pulse which is reflected or backscattered from the fault in the optical fiber and coupled back into the optical device.

2. The apparatus of claim 1 wherein the first bias voltage is a forward-bias voltage which drives the optical device above a lasing threshold to generate the pulse of light.

3. The apparatus of claim 2 wherein the second bias voltage is smaller than the first bias voltage.

4. The apparatus of claim 2 wherein the second bias voltage is a reverse-bias voltage.

5. The apparatus of claim 2 wherein the second bias voltage has a voltage level substantially equal to zero.

6. The apparatus of claim 1 wherein the optical fiber comprises a single-mode optical fiber.

7. The apparatus of claim 1 wherein the electrical circuit comprises a semiconductor diode connected in series with the optical device to provide a low electrical impedance during an instant of time wherein the pulse of light is generated by the optical device, and to provide a higher electrical impedance during the time thereafter when the second bias voltage is provided to the optical device to detect the reflected or backscattered portion of the light pulse.

8. The apparatus of claim 7 further comprising an amplifier having an input connected to a side of the optical device which is connected in series with the semiconductor diode, with the amplifier receiving an electrical output signal generated by the optical device upon detecting the reflected or backscattered portion of the light pulse, and providing an amplified output signal therefrom.

9. The apparatus of claim 1 wherein the electrical circuit comprises a transistor connected in series with the optical device to provide a low electrical impedance during the instant of time the pulse of light is generated by the optical device, and to provide a higher electrical impedance during the time thereafter when the second bias voltage is provided to the optical device to detect the reflected or backscattered portion of the light pulse.

10. The apparatus of claim 9 further comprising an amplifier having an input connected to a side of the optical device which is connected in series with the transistor, with the amplifier receiving an electrical output signal generated by the optical device upon detecting the reflected or backscattered portion of the light pulse, and providing an amplified output signal therefrom.

11. The apparatus of claim 1 further comprising timing means for determining a time interval between the instant of time the light pulse is generated and a time thereafter when the reflected or backscattered portion of the light pulse is detected by the optical device.

12. An apparatus for locating a fault in an optical fiber, comprising:
  (a) a vertical-cavity surface-emitting laser (VCSEL) comprising a pair of distributed Bragg reflector (DBR) mirrors sandwiched about a quantum-well active region; and
  (b) an electrical circuit operatively connected to the VCSEL comprising:
    (i) a switching device connected in series with the VCSEL, with the switching device being electrically conductive when the VCSEL is activated by a first input signal to generate a pulsed light output, and with the switching device being substantially nonconductive when the VCSEL is activated by a second input signal to detect a portion of the pulsed light output which is reflected or backscattered from the fault in the optical fiber; and
    (ii) an amplifier having an input connected to a side of the VCSEL which is connected to the switching device, with the amplifier receiving an electrical output signal generated by the VCSEL upon detecting the reflected or backscattered portion of the pulsed light output and providing an amplified output signal therefrom.

13. The apparatus of claim 12 wherein the switching device comprises a semiconductor diode.

14. The apparatus of claim 12 wherein the switching device comprises a transistor.

15. The apparatus of claim 12 wherein the optical fiber comprises a single-mode optical fiber.

16. The apparatus of claim 12 wherein the first input signal forward biases the VCSEL to generate the pulsed light output.

17. The apparatus of claim 16 wherein the second input signal reverse biases the VCSEL to detect the reflected or backscattered portion of the pulsed light output.

18. The apparatus of claim 16 wherein the second input signal has a voltage level substantially equal to zero.

19. A vertical-cavity surface-emitting laser (VCSEL) fiber-optic transmitter having a built-in capability for locating a fault within an optical fiber, comprising:
  (a) a VCSEL comprising a pair of distributed Bragg reflector (DBR) mirrors sandwiched about a quantum-well active region; and
  (b) an electrical circuit operatively connected to the VCSEL comprising a switching device connected in series with the VCSEL, and an amplifier having an input connected to a side of the VCSEL which is connected in series with the switching device, with the switching device being electrically conductive when the VCSEL is activated by a first input signal to generate a pulsed light output or a modulated light output, and with the switching device being substantially nonconductive when the VCSEL is activated by a second input signal to detect a portion of the pulsed light output which is reflected or backscattered from a fault in the optical fiber, and with the amplifier receiving an electrical output signal from the VCSEL upon detecting the reflected or backscattered portion of the pulsed light output, and providing an amplified output signal therefrom.

20. The apparatus of claim 19 wherein the switching device comprises a semiconductor diode.

21. The apparatus of claim 19 wherein the switching device comprises a transistor.

22. The apparatus of claim 19 wherein the optical fiber comprises a single-mode optical fiber.

23. The apparatus of claim 19 wherein the first input signal forward biases the VCSEL to generate the pulsed light output or the modulated light output.

24. The apparatus of claim 23 wherein the second input signal reverse biases the VCSEL to detect the reflected or backscattered portion of the pulsed light output.

25. The apparatus of claim 23 wherein the second input signal has a voltage level substantially equal to zero.

26. A vertical-cavity surface-emitting laser (VCSEL) fiber-optic transmitter having a built-in capability for locating a fault within an optical fiber, comprising:
  (a) a VCSEL comprising a pair of distributed Bragg reflector (DBR) mirrors sandwiched about a quantum-well active region, with a semiconductor junction being formed about the quantum-well active region; and
  (b) an electrical circuit connected to the VCSEL to forward-bias the semiconductor junction in the VCSEL to generate a modulated light output containing information to be transmitted through the optical fiber in response to a first electrical input signal and to generate a test pulse of light for detecting the fault in the optical fiber in response to a second electrical input signal, with the electrical circuit after generating the test light pulse then biasing the semiconductor junction in the VCSEL to form a resonant cavity photodetector to detect a portion of the test light pulse which is reflected or backscattered from the fault in the optical fiber to generate an electrical output signal having timing information about the location of the fault in the optical fiber.

27. The VCSEL fiber-optic transmitter of claim 26 wherein the electrical circuit further comprises an amplifier having an amplifier input electrically connected to one side of the semiconductor junction to amplify the electrical output signal and provide an amplified output signal having the timing information about the location of the fault in the optical fiber.

28. The VCSEL fiber-optic transmitter of claim 27 wherein the electrical circuit further comprises a semiconductor diode connected in series with the VCSEL.

29. The VCSEL fiber-optic transmitter of claim 27 wherein the electrical circuit further comprises a transistor connected in series with the VCSEL.

30. The apparatus of claim 26 wherein the optical fiber comprises a single-mode optical fiber.

31. An optical-fiber communication method, comprising steps for:
  (a) transmitting information through an optical fiber as a series of light pulses produced by a vertical-cavity surface-emitting laser (VCSEL) comprising a pair of distributed Bragg reflector (DBR) mirrors sandwiched about a quantum-well active region; and
  (b) detecting a fault within the optical fiber using the VCSEL by:
    (i) generating a test light pulse from the VCSEL at an instant in time, and coupling the test light pulse into the optical fiber; and
    (ii) for a period of time thereafter detecting with the VCSEL a portion of the test light pulse which is reflected or backscattered from the fault in the optical fiber.

32. The method of claim 31 further comprising a step for determining the location of the fault within the optical fiber by comparing the instant in time when the test light pulse is generated by the VCSEL to a time thereafter when the reflected or backscattered portion of the test light pulse is detected with the VCSEL.

33. The method of claim 31 wherein the step for transmitting information through the optical fiber comprises providing the information as an electrical input signal, and modulating the VCSEL using the electrical input signal.

34. The method of claim 33 wherein modulating the VCSEL using the electrical input signal comprises digitally modulating the VCSEL.

35. The method of claim 31 wherein the step for generating the test light pulse comprises forward-biasing the VCSEL above a lasing threshold.

36. The method of claim 35 wherein the step for generating the test light pulse further comprises providing a semiconductor diode in series with the VCSEL, and switching the semiconductor diode to an "on" state.

37. The method of claim 35 wherein the step for generating the test light pulse further comprises providing a transistor in series with the VCSEL, and switching the transistor to an "on" state.

38. The method of claim 31 wherein the step for detecting the reflected or backscattered portion of the test light pulse with the VCSEL comprises reverse-biasing the VCSEL.

39. The method of claim 31 wherein the step for detecting the reflected or backscattered portion of the test light pulse with the VCSEL comprises biasing the VCSEL at a bias voltage substantially equal to zero.

40. The method of claim 31 wherein the step for detecting the reflected or backscattered portion of the test light pulse with the VCSEL comprises forward-biasing the VCSEL below a threshold for lasing.

41. The method of claim 31 wherein the step for detecting the reflected or backscattered portion of the test light pulse further comprises providing a semiconductor diode connected in series with the VCSEL, and switching the semiconductor diode to an "off" state.

42. The method of claim 31 wherein the step for detecting the reflected or backscattered portion of the test light pulse further comprises providing a transistor connected in series with the VCSEL, and switching the transistor to an "off" state.

43. The method of claim 31 wherein the optical fiber comprises a single-mode optical fiber.

44. An apparatus for locating a fault within a single-mode optical fiber, comprising:
  (a) a vertical-cavity surface-emitting laser (VCSEL) comprising a quantum-well active region surrounded by a pair of distributed Bragg reflectors, with the VCSEL generating a pulse of light that is coupled into one end of the single-mode optical fiber, and subsequently detecting a portion of the pulse of light which reflected or backscattered from the fault to provide an indication of the location of the fault within the single-mode optical fiber; and
  (b) an electrical circuit operatively configured to forward-bias the VCSEL to generate the pulse of light at one instant of time, with the electrical circuit being operatively configured to not require reverse-biasing of the VCSEL to detect the portion of the reflected or backscattered light pulse of light.

* * * * *